INVENTOR.
James A. Cunningham
BY John D. Graham
ATTORNEY

INVENTOR.
James A. Cunningham
BY John D. Graham

INVENTOR.
James A. Cunningham
BY
John G. Graham

INVENTOR.
James A. Cunningham
BY John D. Graham

INVENTOR.
James A. Cunningham
BY
John D. Graham

May 14, 1968 J. A. CUNNINGHAM 3,383,568

SEMICONDUCTOR DEVICE UTILIZING GLASS AND OXIDES AS AN INSULATOR FOR HERMETICALLY SEALING THE JUNCTIONS

Filed Feb. 4, 1965 7 Sheets-Sheet 6

INVENTOR.
James A. Cunningham
BY
John G. Graham

INVENTOR.
James A. Cunningham
BY
John D. Graham

United States Patent Office 3,383,568

Patented May 14, 1968

3,383,568

SEMICONDUCTOR DEVICE UTILIZING GLASS AND OXIDES AS AN INSULATOR FOR HERMETICALLY SEALING THE JUNCTIONS

James A. Cunningham, Richardson, Tex., assignor to Texas Instruments Incorporated, Dallas, Tex., a corporation of Delaware Filed Feb. 4, 1965, Ser. No. 430,369
13 Claims. (Cl. 317—235)

ABSTRACT OF THE DISCLOSURE

Disclosed is a semiconductor device on which an oxide is placed over a thin film contact and interconnections prior to the application of a glass coating. A second oxide may then be placed over the glass to facilitate additional interconnections.

This invention relates to semiconductor devices and manufacturing methods therefor, and more particularly to using glass as an insulating material between ohmic contacts and also over expanded metal contacts as a means of sealing the junctions. The invention is particularly applicable to integrated circuits.

In a field of semiconductor technology, it is necessary to provide a method for hermetically sealing the transistor junctions in order to avoid contamination of these junctions during fabrication as well as during operation. One such method has involved providing a hermetically sealed external package. Although this technique partially solves the contamination problem during operation of the transistor, there still remains the possibility of contamination during the processing of the transistor device. In addition, this external packaging correspondingly means higher manufacturing costs.

It is desirable, therefore, to provide a method whereby each individual junction, and in particular the collector-base junction of the transistor, is hermetically sealed by a glass layer. There are difficulties associated with this objective, however, due in part to the minute dimensions of the active regions, which prevent the application of ohmic contacts above the glass layer that seals the junctions. Since these contacts therefore cannot be applied above the glass that hermetically seals the junctions, they must be applied beneath it. Thus a metal must be chosen for such contacts which is suitable for making ohmic contact under glass with the active regions of the semiconductor device.

Expanded aluminum contacts are destroyed by the direct application of even a low melting temperature glass over the contacts. After such application the glass corrodes the contact metal whereupon bits of the metal break away and float to the upper surface of the glass layer. Other refractory contact metals make poor ohmic contact with the semiconductor material and are also destroyed by direct application of the glass.

Similar problems are also encountered when an insulating material is required to separate the various levels of interconnectors and intraconnectors in integrated circuit devices. Prior devices have used silicon oxide as the insulating material, but there are disadvantages associated with this material that severely limits its use. First, silicon oxide has pinholes which allow the metal used as the connectors to penetrate the oxide, thereby causing a short. Also, when the silicon oxide layer is selectively etched to enable subsequent connections to be made to the underlying metal region, there is an undesirable undercutting of the oxide resulting in an irregular interface within the area of contact.

With the difficulties heretofore encountered in mind, an object of this invention is the provision of a semiconductor device such as a transistor or the like having its junction areas hermetically sealed by glass, thus eliminating the requirement of a hermetically sealed external package.

Another object of the invention is the application of a glass layer over expanded metal contacts without destroying the contacts.

Another object of the invention is the provision of a material over the expanded metal contacts which can be applied at low temperatures and protect the contacts from the effects of the subsequent glassing.

A further object of the invention is the utilization, in the production of transistors and similar devices, of a glass having an optimum relationship between its coefficient of thermal expansion and its temperature of fusion.

A still further object of this invention is the provision of integrated circuit devices having layer or layers of improved insulating material separating the various levels of interconnectors and intraconnectors.

In accordance with these objects as well as many others, this invention embodies semiconductor devices and integrated circuits each having a layer of silicon oxide provided above the expanded contacts, a glass layer superimposed upon the layer of silicon oxide, hermetically sealing the junction areas, and an additional layer of silicon oxide over the glass layer to protect the glass layer from being damaged during subsequent processing. The application of the first layer of silicon oxide between the glass layer and the metal contact area will obviate the difficulties mentioned above associated with applying the glass layer directly on the ohmic contacts. In addition the use of the glass as an insulating layer has a number of advantages over solely using the one layer of silicon oxide. Of primary importance is the fact that the glass is a better insulator than silicon oxide, thereby reducing the possibility of the device being shorted. In addition the glass layer may be more readily fabricated to a thickness greater than the silicon oxide, thereby reducing the capacitance between the contact regions. Furthermore the glass, when applied in the manner described in this invention, forms sloping sides rather than the irregular interface associated with the etched silicon oxide layer as pointed out earlier.

The novel features believed to be characteristic of this invention are set forth in the appended claims. The invention itself, however, as well as other objects and advantages thereof, may best be understood by reference to the following detailed description of illustrative embodiments when read in conjunction with the accompanying drawings wherein:

Figure 1:
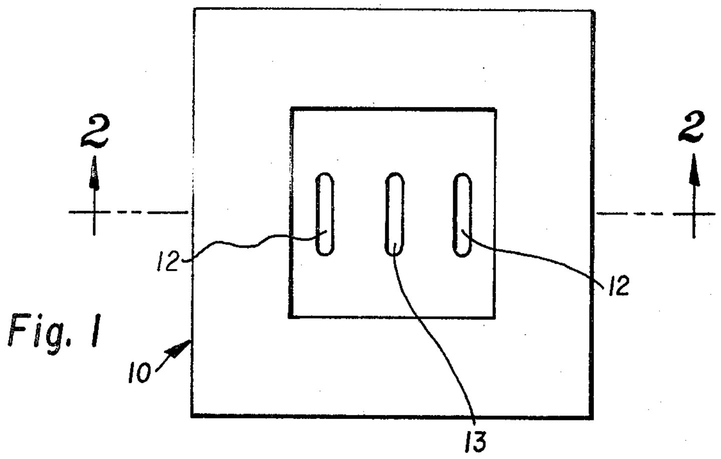
FIGURE 1 is a plan view of a semiconductor wafer having a planar transistor body formed therein, with holes cut in the oxide coating thereof for the application of contacts.
Figure 2:
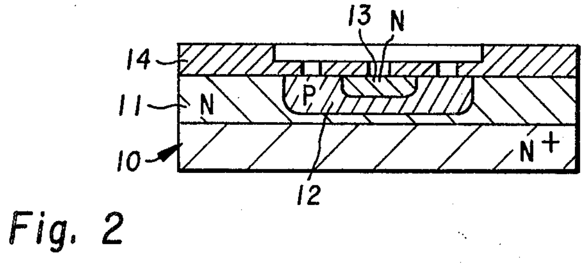
FIGURE 2 is a sectional view of the wafer in FIGURE 1 taken along the section line 2—2.

With reference to FIGURES 1 and 2, there is shown a transistor wafer 10 having therein base and emitter regions 12 and 13, respectively, the remainder of the wafer being the collector region. The base 12 and emitter 13 regions may be formed by the well known planar technique, which leaves an oxide coating 14 on the top surface of the wafer, or by any other means which achieves the same result, the oxide being thereafter removed in the known manner from above the regions 12 and 13 (as shown in FIGURE 2) for the application of the contacts.

Figure 3:
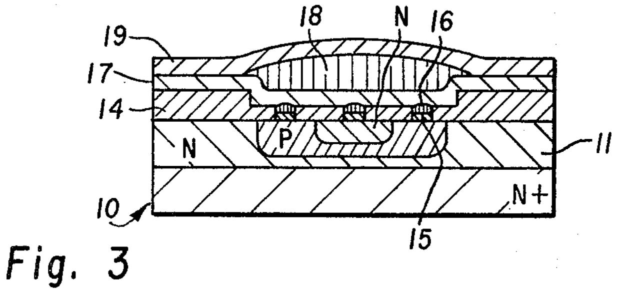
FIGURE 3 is the same as FIGURE 2 after the expanded metal contacts and the subsequent layers of material have been deposited on the wafer surface.
Figure 4:
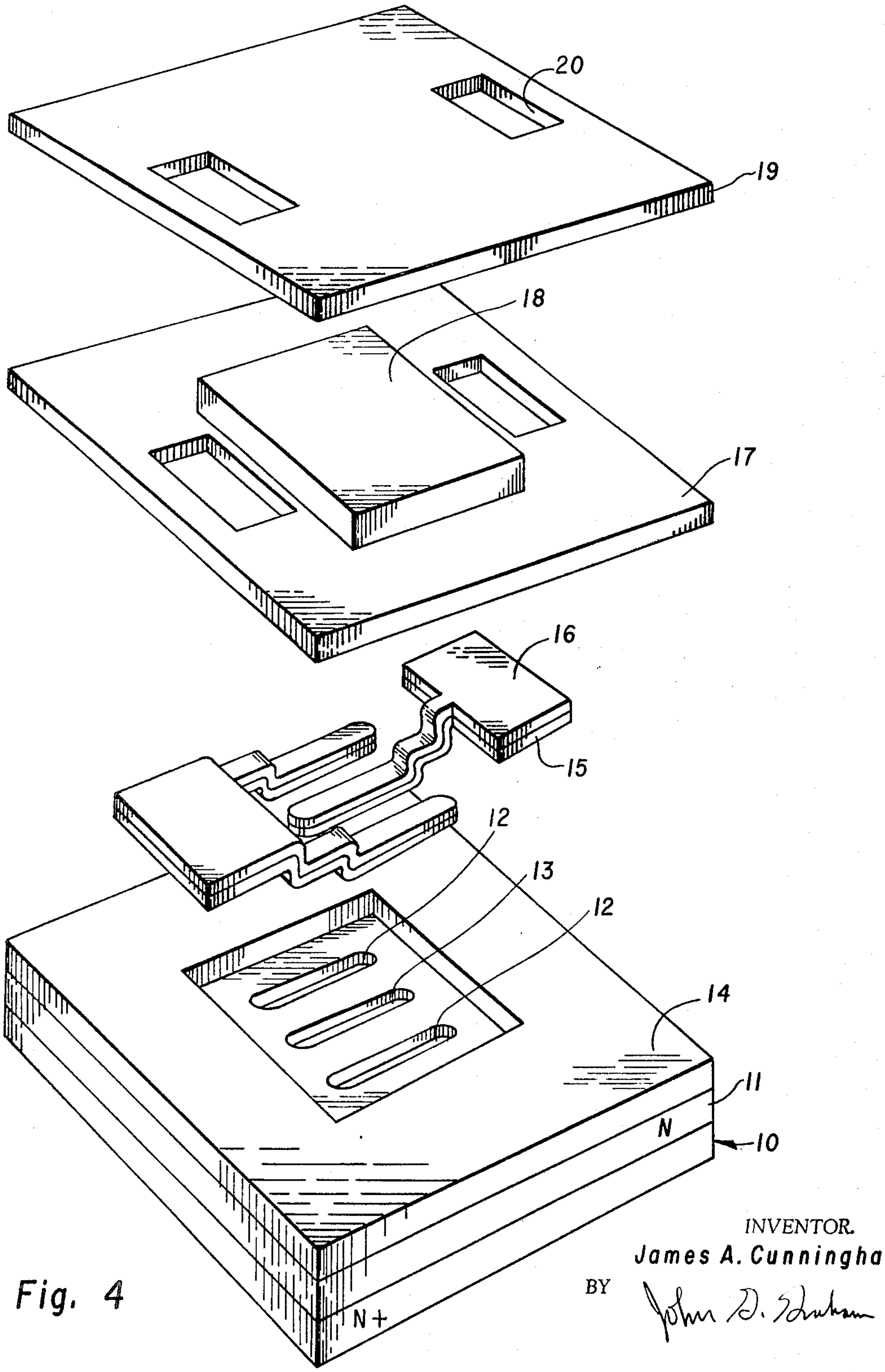
FIGURE 4 is an exploded view of the structure of FIGURE 3.
Figure 5:
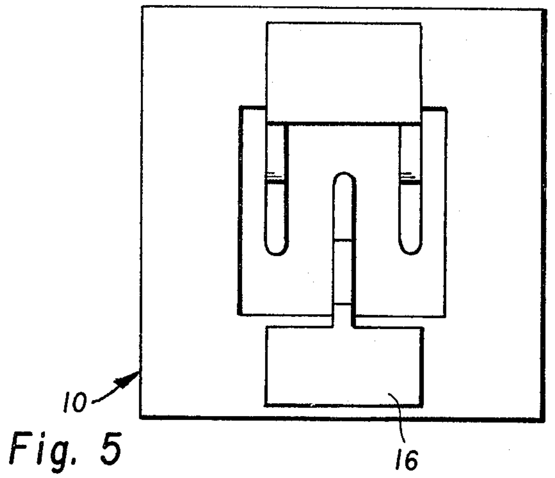
FIGURE 5 is a plan view of the wafer of FIGURE 1 after the expanded metal contacts have been applied.

FIGURE 4 shows, by an exploded view, the elements of the transistor body shown in cross-section in FIGURE 3, namely, the wafer 10, the silicon dioxide layer 14, the base region 12, the emitter region 13, the expanded contact layers 15 and 16, an additional silicon dioxide layer 17, a glass layer 18, and the final silicon dioxide layer 19.

The expanded contacts 15 and 16 may be one layer of metal or may be multilayered as illustrated. A typical combination is molybdenum-aluminum. The contacts may be deposited onto the base and emitter regions 12 and 13, respectively, by any of the several methods known in the art, including vapor deposition, a typical approach.

The second layer 17, silicon dioxide, may be applied by methods known in the art. A preferred method, however, would be the "oxidative" technique, by which oxygen and tetraethoxysilane are reacted at 250–500° C., the oxygen being bubbled through liquid tetraethoxysilane at room temperature. The gaseous reaction mixture is combined with excess oxygen and passed into a furnace tube containing a number of wafers 10 where oxidation takes place. The silicon dioxide thereby produced is deposited on all surfaces within the tube including the wafers.

Typical reaction conditions for the oxidative method involve, by way of example, a flow rate of one cubic foot of oxygen per hour into the liquid tetraethoxysilane. The reaction mixture is then mixed with excess oxygen, also at a rate of one cubic foot per hour, and passed into the tube. At 500° C. in a two-inch diameter quartz furnace tube, excellent deposits of silicon dioxide are formed at rates from 1300–1400 A. per hour on the wafers mounted therein.

Referring again to FIGURES 3 and 4, there is shown a glass layer 18 superimposed on the silicon dioxide layer 17 to the extent of covering the junction area. The glass layer is preferably produced and deposited in the form of a photo-definable substance by mixing the glass with photoresist. A slurry of powdered glass mixed with a liquid photoresist polymer is first prepared. The glass should be one that fuses at a comparatively low temperature, has substantially the same coefficient of thermal expansion as silicon dioxide, and produces minimal surface contamination. Corning 7570 glass, a lead borosilicate glass with a fusion temperature of 550° C., for example, has proven excellent, but any other glass having similar properties will do. The photoresist used should be centrifuged to remove any particulate matter before being mixed with the glass to form a slurry. This photoresist may be of the type disclosed in U.S. Patents 2,670,-285, 2,670,286, and 2,670,287 of L. M. Minsk, or preferably may be a material available from the Eastman Kodak Company under the tradename "Kmer."

To prepare the slurry, the glass is first ground in hard polyethylene bottles with methyl alcohol as the fluid medium The grinding may be accomplished by any satisfactory means, but preferably by extra-hard 96% alumina balls. A twenty hour grinding time produces satisfactory results without alumina contamination from the balls, but some polyethylene contamination results. The polyethylene contamination may be overcome by leaching the solution for forty-eight hours in xylene at 85° C. The xylene is then filtered off, leaving a glass paste. A typical slurry composition forming a stable suspension is glass 35% by weight, photoresist liquid 45% by weight and xylene 20% by weight.

Using the slurry with conventional photomasking methods, and using an appropriate mask to expose only the area above the active regions of the transistor, a layer of glass and photoresist 18 is deposited above the silicon dioxide layer 17 on the wafer. After developing the glass-photoresist layer with a suitable photo developer, leaving only the centrally located glass area 18, the wafer is then placed in a furnace or heated with oxygen by some other appropriate technique to a temperature sufficiently high to "burn off" the photoresist polymer, after which the furnace temperature is raised above the fusion temperature of the glass to cause the glass layer 18 to be fused onto the substrate as shown in FIGURE 3. It is to be noted, as a particular feature of this invention, that using the process as described above, the glass layer 18 is positioned so that it covers the junction area but is confined to the central portion of the wafer, as observed in FIGURE 4. This positioning will allow subsequent external connections to be made to the ohmic contacts 16 without the necessity of cutting through the glass.

Figure 6:
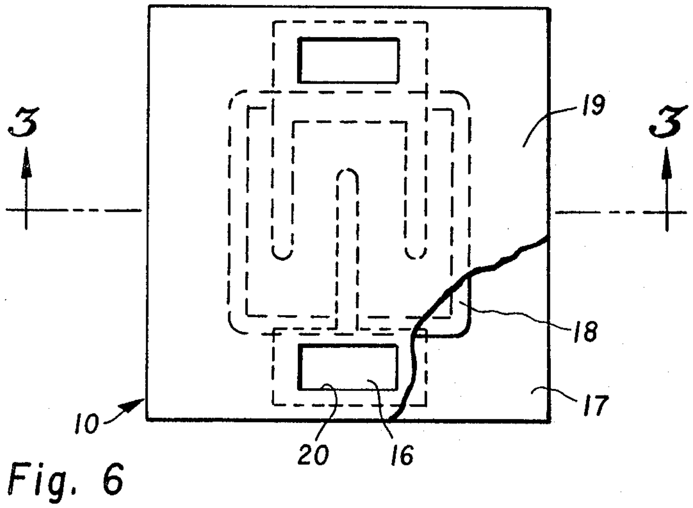
FIGURE 6 is the same as FIGURE 5 after the final layers of material have been deposited over the expanded metal contacts.

Following the fusing of the glass 18 over the surface of the wafer is the deposition of another layer 19 of silicon dioxide. This layer is deposited by the low temperature oxidative process described above. The oxide may be removed by any standard technique to expose the contact areas at 20, as shown in FIGURES 4 and 6.

Lead wires or other connections can now be bonded to base and emitter contacts 16 beneath the areas 20.

Figure 7:
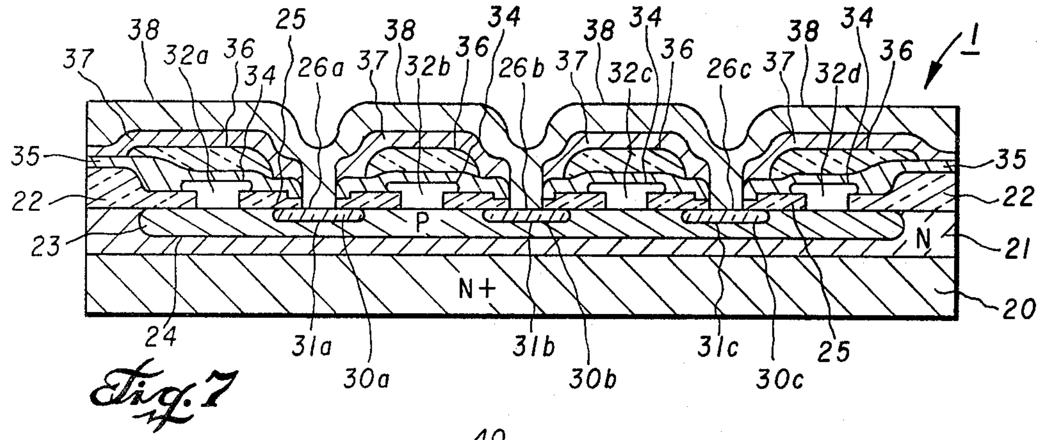
FIGURE 7 is a sectional view of a portion of a semiconductor wafer taken along the line 7—7 of FIGURE 8 showing the result of the steps in the manufacture of a high power transistor device produced according to the method of this invention.
Figure 8:
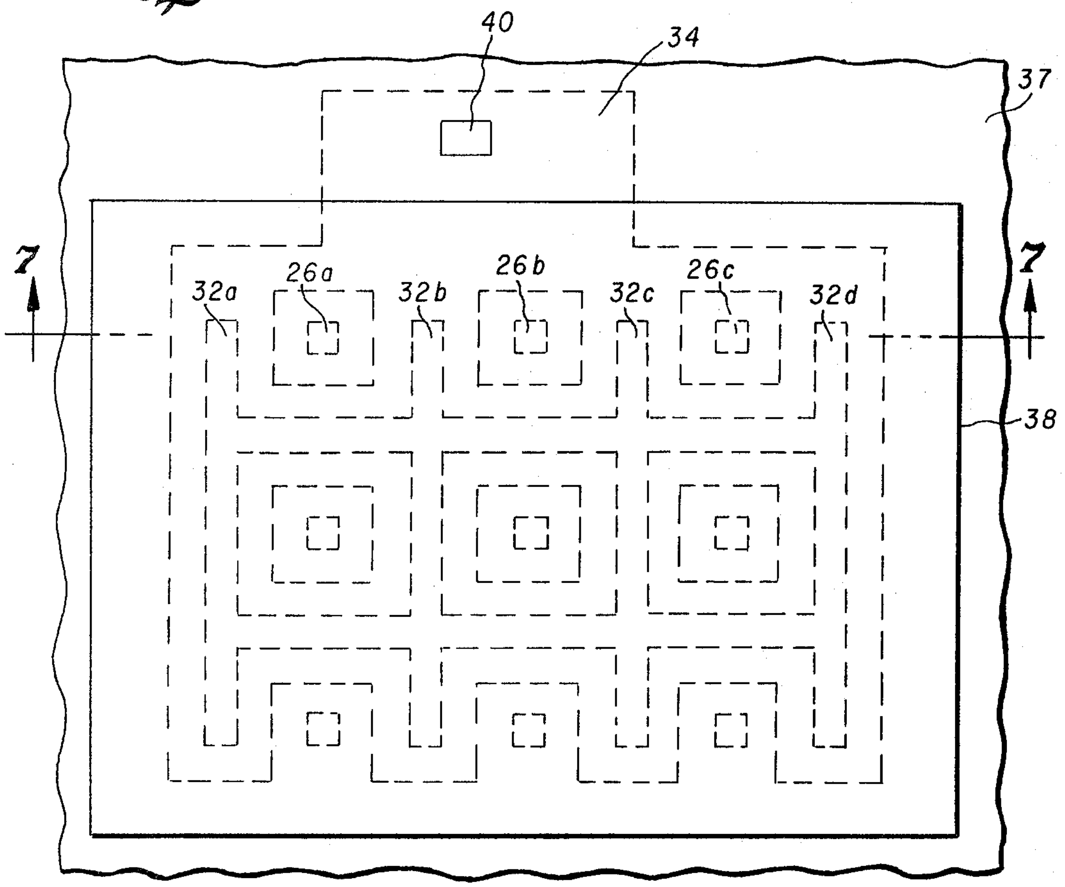
FIGURE 8 is the plan view of the wafer of FIGURE 7 showing the expanded metal contacts.

There is now illustrated in FIGURES 7 and 8 a hermetically sealed high power transistor device. FIGURE 7 is a section view along the line 7—7 of FIGURE 8, showing the result of each of the steps in the manufacture of the device thereof. A layer 21 of N-type semiconducting material, silicon for example, is first epitaxially deposited upon a low resistivity heavily doped N-type body 20 of the same semiconducting material. The body 20 provides better ohmic contact between the layer 21 which serves as the collector region and subsequent external connections. An oxide layer 22 is then formed upon the upper surface of the layer 21 in any conventional manner. Using photoresist masking and etching techniques, for example, an opening (not shown as such) is formed within the oxide layer 22 to expose a corresponding portion of the surface of the collector region 21. Within this area there is diffused a P-type impurity to form a base region 23, thereby providing a junction 24, hereafter referred to as the collector-base junction. During the P-type diffusion operation, there will be naturally grown a thin silicon oxide layer 25. As a further step in the manufacture of the present invention, the photoresist masking and etching process may again be used to form a plurality of apertures 26*a*, 26*b* and 26*c*. Through these apertures, there is then diffused an N-type impurity forming the emitter layers 30*a*, 30*b*, and 30*c*, respectively. In between the emitter regions and the base region 23 there are produced the emitter-base junctions 31*a*, 31*b*, and 31*c*. Very thin silicon oxide layers will be formed during the N-type diffusion covering the upper surfaces of the emitter regions 30*a*, 30*b*, and 30*c*.

The oxide layer 25 is then selectively removed at the locations 32*a*, 32*b*, 32*c*, and 32*d* to expose the base region 23 within these openings. Expanded ohmic contacts are then formed by depositing metal over the oxide layer 25 and within the openings at the locations 32*a*, 32*b*, 32*c*, and 32*d* by any conventional technique, such as vacuum evaporation, and then selectively removing the metal to form the expanded base contact 34 shown in FIGURES 7 and 8. As in the previous embodiment, the contact may be formed of one layer or may be multilayered and formed of a variety of materials, such as a thin layer of molybdenum with a layer of aluminum thereover, for example. A silicon oxide layer 35 is then applied over the upper surface of the device 1 as shown, preferably using the low temperature oxidative technique described previously, so as to completely cover the expanded contact 34. Thereafter the glass layer 36 is superimposed on the silicon oxide layer 35, and using the glass-photoresist method described in the previous embodiment, for example, layer 36 is resolved into portions that completely cover the contacts at the locations 32*a*, 32*b*, 32*c*, and 32*d*. Following the placing of the glass layers 36 over the surface of the device 1 is the low temperature deposition of another layer 37 of silicon oxide as shown in FIGURE 7.

The final steps in the manufacture of the present device include the selective removal of portions of the silicon oxide layers so as to expose the upper surfaces of the emitter regions 30*a*, 30*b*, and 30*c* within the openings 26*a*, 26*b*, and 26*c*. Thereafter a layer or layers of metal are deposited over the upper surface of the device 1 and within the openings 26*a*, 26*b*, and 26*c* so as to form the expanded emitter contact 38 shown in FIGURES 7 and 8. As observed in FIGURE 8 the oxide layers 35 and 37 are removed by conventional photomasking techniques to expose the base contact 34 within the area 40. Lead wires can now be bonded to the base contact 34 and to the emitter contact 38. The layer 20 adjacent the collector region 21 is bonded to a metallic header or package which forms a collector electrode, the resultant device capable of being operated as a high power transistor.

It is to be pointed out as a feature of the previously described embodiment that the large exposed area of the emitter contact 38 will enable a heat sink to be placed adjacent this contact, thus providing a method for dissipating a large amount of heat from the transistor through the emitter regions. Alternatively, it may be observed that the glass layers sandwiched between the oxide layers 35 and 37 may be formed over the emitter regions rather than over the base region, and consequently the expanded contact having the large area exposed at the surface will be the base contact rather than the emitter contact, enabling the heat to be dissipated through the base region rather than through the emitter regions.

Figure 9:
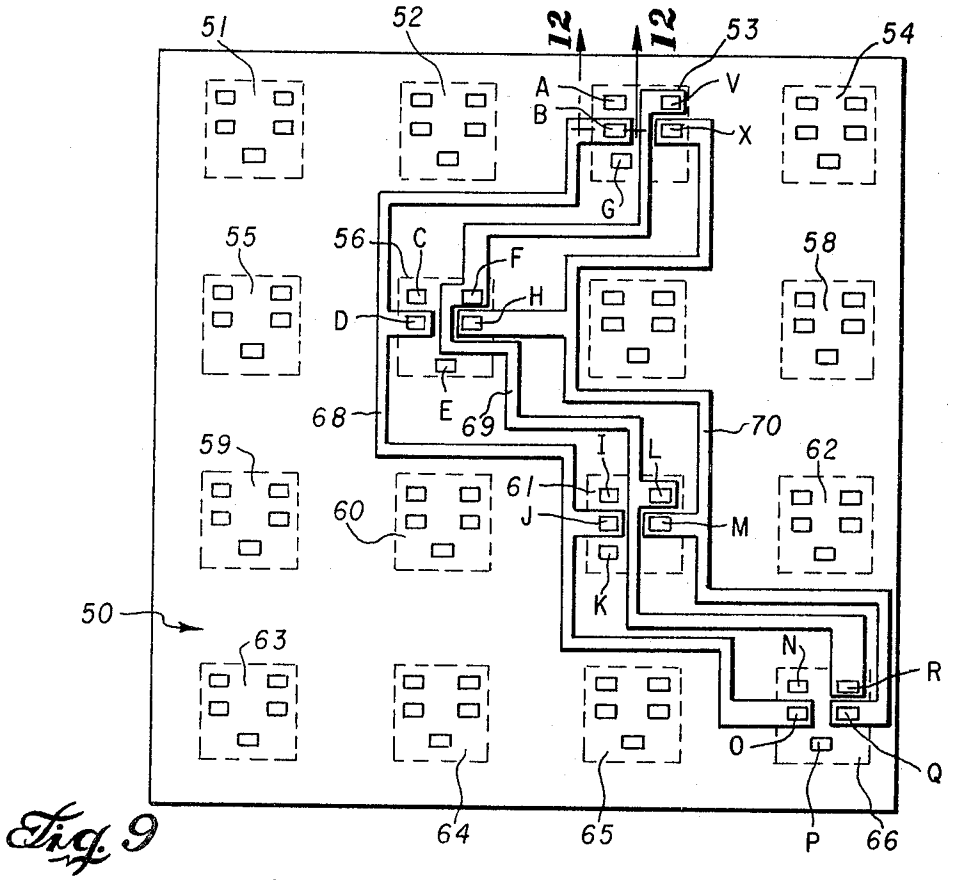
FIGURE 9 is a plan view, greatly enlarged, of a semiconductor wafer containing a plurality of functional elements with a pattern of interconnections defined thereon.

There is illustrated in FIGURES 9–14 an integrated circuit device utilizing the method of manufacture of this invention. A bar or wafer 50 of semiconductor material is shown in FIGURE 9 having a large number of functional elements 51–66 therein. In this illustrative embodiment, only sixteen such functional elements are shown, but a much larger number will ordinarily be utilized. Each of the functional elements 51–66 contains a number of transistors, resistors, capacitors or the like interconnected to form a desired electrical function. For example, the functional element 53 may comprise a circuit such as that shown in FIGURE 10. This circuit includes the PNP transistors 72, 73, 74 and 75 and the NPN transistors 76, 77, 83, 85, 86, 87, and 90, and has three inputs A, B, and X, and an output G, these along with a voltage supply terminal V corresponding to the five terminals seen on the functional element 53 in FIGURE 9.

Figure 10:
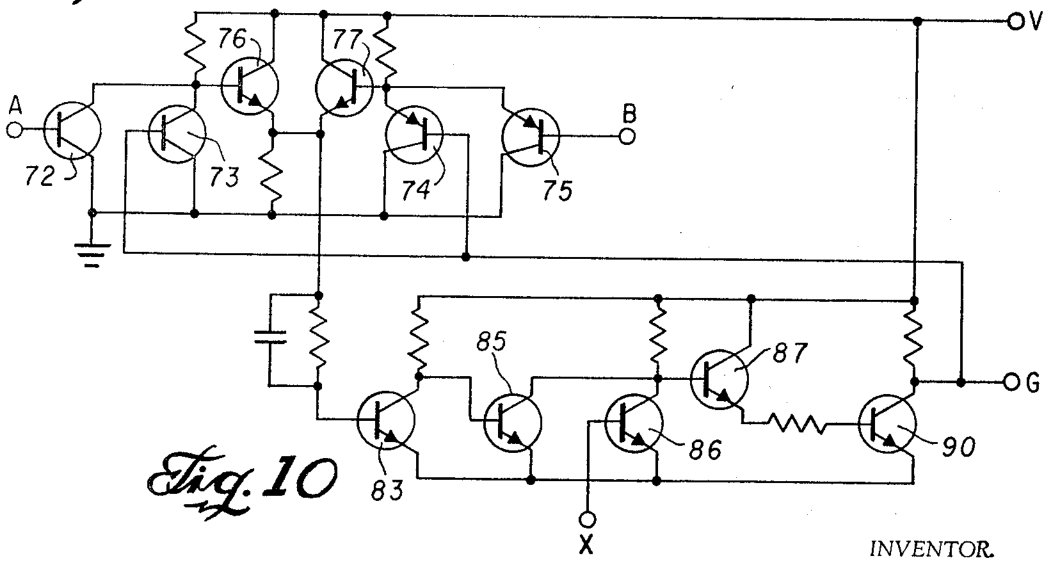
FIGURE 10 is a schematic diagram of the electronic circuit in one of the functional elements in the wafer of FIGURE 9.
Figure 11:
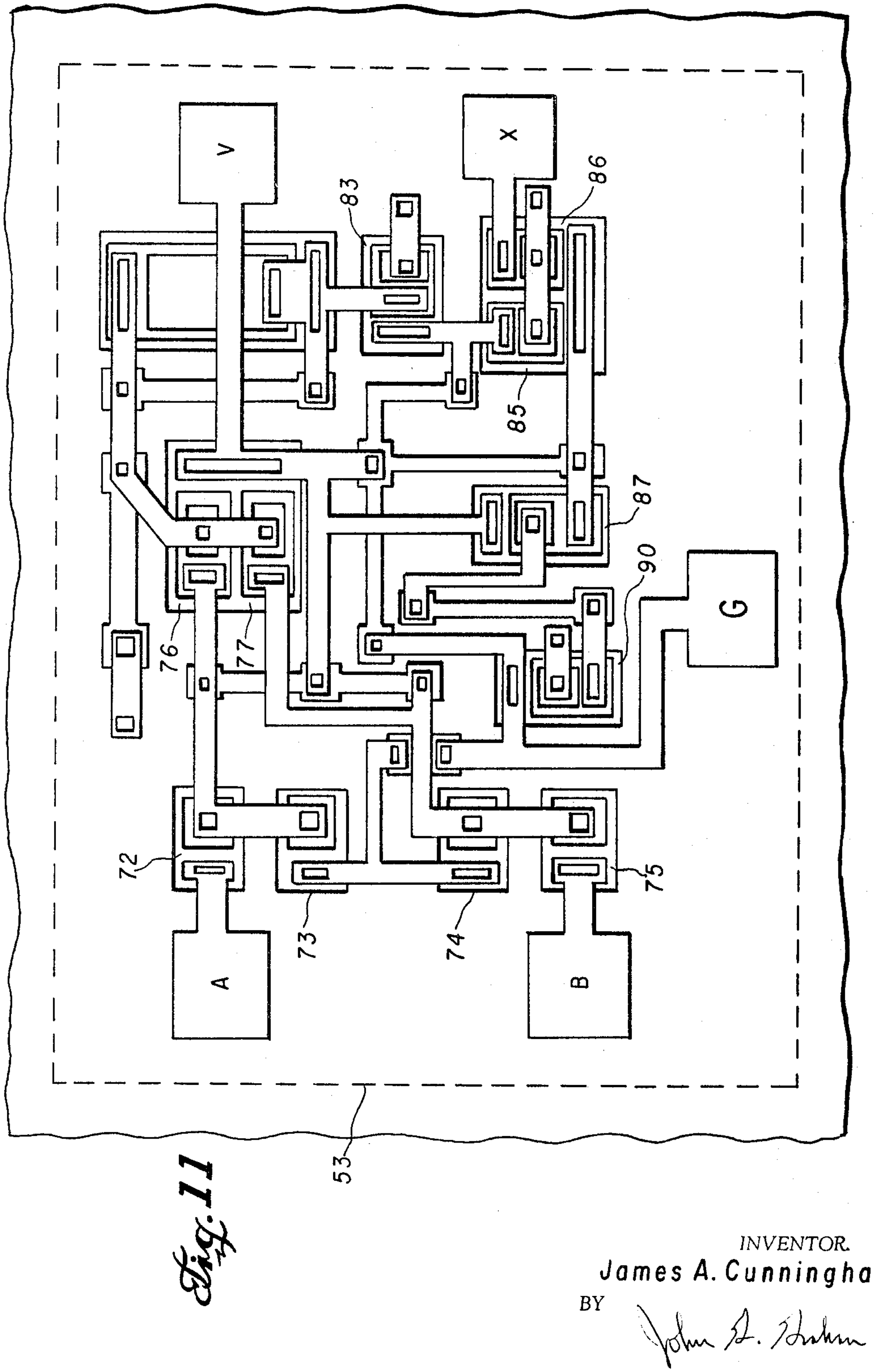
FIGURE 11 is a plan view, greatly enlarged, of the layout of circuit components in one of the functional elements in the wafer of FIGURE 9, these same circuit components being illustrated in schematic diagram form in FIGURE 10.

FIGURE 11 shows a greatly enlarged plan view or layout of the circuit shown in FIGURE 10 formed by integrated circuit techniques in the semiconductor wafer 50. This circuit provides the operating characteristics of the functional element 53, for example. It is to be observed that there is a large number of electrical intraconnections joining the PNP transistors 72, 73, 74, and 75 and the NPN transistors 76, 77, 83, 85, 86, 87, and 90 with the other circuit components represented in FIGURE 10 and eventually to the terminals A, B, V, X, and G. These intraconnections may be formed by any technique known in the art; for example by deposition of metal and selective removal to form the desired pattern, the pattern being created by photographic techniques using a mask made by conventional manual operations, by electron beam exposure of photoresist directly upon the semiconductor body, or by other means. The transistors and the other circuit components may be formed within the semiconductor wafer 50 by any of the techniques known in the integrated circuit art such as epitaxial growth or diffusion operations, for example. Ordinarily the transistors, resistors, and capacitors are formed by diffusion using oxide masking, and the oxide remains on the surface to provide insulation between the semiconductor surface and the deposited metal interconnections.

Referring back to FIGURE 9, it is to be pointed out that the semiconductor wafer 50 contains a large number of functional elements at one face thereof, each element containing five terminals or lands representing its inputs, output and power supply input, the terminals being part of an internal circuit much like the one shown in FIGURE 10, which circuit provides the operating characteristics of the functional element. For the purpose of this embodiment, it is desired to produce a system, containing four of the sixteen functional elements 51–66 appropriately interconnected. As depicted in FIGURE 9, therefore, the terminals B, D, J, and O of functional elements 53, 56, 61, and 66 respectively are electrically connected by the interconnector 68; similarly the terminals V, F, L, and R are electrically connected by the interconnector 69, and the terminals X, H, M, and Q are electrically connected by the interconnector 70.

Recognizing that each functional element includes the circuit components and intraconnection strips as in FIGURE 11, it is seen that the interconnection pattern of FIGURE 9 overlies some of the metal pattern within the functional elements. For this reason, and also due to the fact that the interconnections between functional elements are preferably made in an operation separate from that which forms the intraconnections within an element, the pattern of FIGURE 9 is formed as a second level of metal strips separated from the first level by the three layers of insulating material which have been described in the two previous embodiments of this invention.

Figures 12, 13:
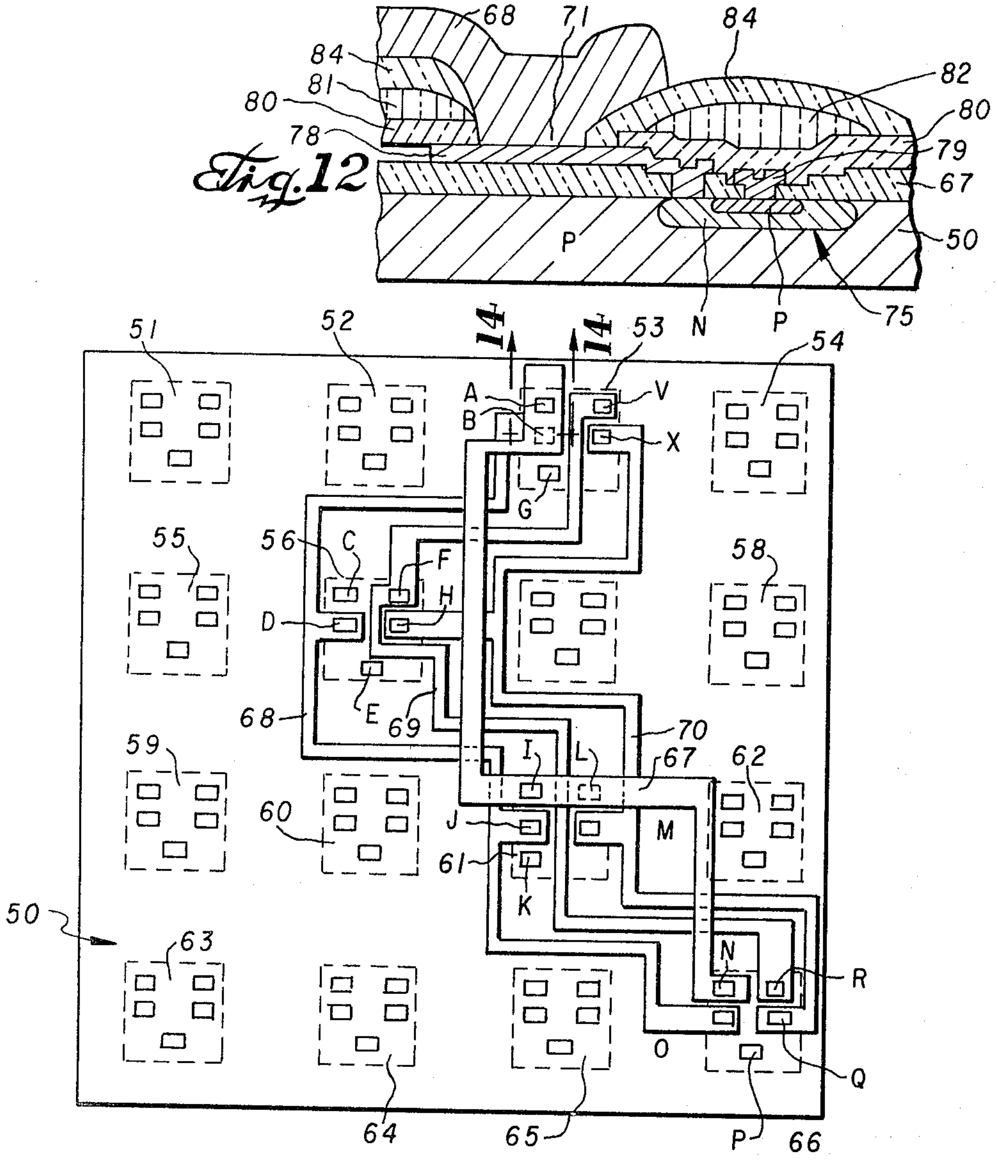
FIGURE 12 is a sectional view of the wafer of FIGURE 9, taken along the line 12—12, showing the two levels of connections.
FIGURE 13 is a plan view, greatly enlarged, of the same area as shown in FIGURE 9 but having an additional level of interconnectors.
Figure 14:
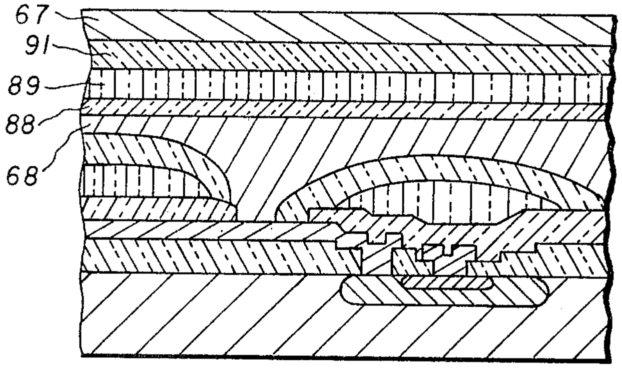
FIGURE 14 is a sectional view of the wafer of FIGURE 13, taken along the line 14—14, showing the additional level of interconnectors.

This arrangement is illustrated in FIGURE 12 where a sectional view of a portion of the semiconductor wafer 50 is observed at the point where interconnection 68, depicted in FIGURE 9, engages the terminal or land B of the functional element 53 directly above one of the PNP transistors of FIGURE 11.

Referring now to FIGURE 12, the semiconductor wafer 50 is formed of P-type silicon for example, thus providing the collector region, the diffused N-type region is the base region, and the diffused P-type region is the emitter. An insulating coating 67, typically silicon oxide, defining a stepped configuration due to the successive diffusions using oxide masking, covers the top surface of the wafer 50. The metal contacts or intraconnections 78 and 79 overlying the coating 67 and making contact with the base and emitter regions respectively are formed by any technique known in the art, for instance the vapor deposition of molybdenum followed by aluminum and selective removal of the metals to leave the desired contacts. As pointed out earlier with reference to the plan view illustrated in FIGURE 11, the pattern of the intraconnections 78 and 79 could be formed by photoresist etching techniques as one method, and may conveniently be referred to as first-level connections.

A layer 80 of silicon oxide is then applied upon the upper surface of the wafer, preferably by the low temperature oxidative technique described above so that the components and materials already formed in or on the wafer will not be degraded by high temperature. This layer 80 completely covers the intraconnections 78 and 79. The glass layers 81 and 82 preferably being produced by the glass-photoresist method as described previously, are superimposed upon the silicon oxide layer as shown in FIGURE 12. Thereafter another layer 84 of silicon oxide is placed over the glass layers 81 and 82 by the low temperature technique, thereby forming the final layer of the three layer insulating material shown.

Through the use of well-known photoresist masking and etching techniques, for example, the oxide layers 80 and 84 are selectively removed within the area 71 to expose a portion of the intraconnector 78 which is the B terminal. Thereafter the entire top surface of the wafer is coated with a thin metal film of aluminum for example, which makes contact with the intraconnector 78 within the area 71. Using a photoresist masking and etching process, the metal film is then removed in the undesired areas to form the interconnector 68, the pattern of which is observed in FIGURE 9.

As a result of the above-described steps, the interconnector 68 is formed at a second level, insulated except at the contact area 71, from the first level connections, intraconnectors 78 and 79, by the glass layers 81 and 82 sandwiched between the two oxide layers 80 and 84. The glass layer 82 also serves to hermetically seal the junctions of the PNP transistor shown in FIGURE 12.

Although the above-described embodiment shows the utilization of the three layer insulating material of this invention to isolate first level connections from second level connections, it is equally applicable whenever multilevel connections are required in integrated networks. For example FIGURE 13 shows the interconnection pattern where the additional interconnector 67 connects terminal A of element 53 to the terminals I and N of elements 61 and 66 respectively. Looking at FIGURE 14, the sectional view of the same region shown in FIGURE 12, there is now depicted the additional third level interconnector 67 insulated from the second level interconnector 68 by the glass layer 89 sandwiched between the silicon oxide layers 88 and 91, these layers being formed as described above.

It is understood of course that the semiconductor integrated circuit shown in FIGURES 9–14 and described above is merely illustrative of one of the many that may be fabricated using the method of this invention. Similarly the method of fabrication may be altered to the extent of having all diffused regions, all epitaxial layers or a combination of the two. Other active elements, such as junction type field-effect transistors, diode structures, thin film devices, etc. may also be fabricated using the method of this invention, i.e. whenever the junctions are to be hermetically sealed and/or the ohmic contacts are to be insulated from each other.

While silicon is given as an example of the semiconductor material used in all of the above-described embodiments, other semiconductors such as germanium or the III–V compounds, for example, may be used. Similarly the transistors may be formed using either NPN type diffusions or PNP type diffusions.

While the invention has been described with reference to illustrative embodiments, it is understood that this description is not to be construed in a limiting sense. Other embodiments of the inventive concept, as well as modifications of the disclosed embodiments, will appear to persons skilled in the art. It is thus contemplated that the appended claims will cover any such embodiments or modifications as fall within the true scope of the invention.

What is claimed is:

1. A semiconductor device comprising in combination:
(a) a semiconductor body having planar base and emitter regions covered by a first non-conductive coating,
(b) conductive films deposited onto said body and making contact with the base and emitter regions through holes etched in the first non-conductive coating,
(c) a layer of silicon dioxide deposited over the conductive films in at least the base and emitter regions and
(d) a layer of glass deposited over that portion of said silicon dioxide layer which overlies said emitter and base regions to seal said regions hermetically, said conductive films extending beyond said layer of glass and formed into terminals for external circuit connections through the silicon dioxide layer.

2. The semiconductor device defined by claim 1 wherein a non-conductive coating overlies the semiconductor body above the glass layer.

3. A semiconductor device comprising in combination:
(a) a semiconductor body having a surface-adjacent region which is composed of semiconductor material of conductivity type opposite that of subjacent semiconductor material with a P-N junction surrounding the region and extending to a face of the body to define an enclosed area of the face,
(b) a first non-conductive coating on said face of the semiconductor body,
(c) a conductive film engaging said face of the body at the surface of the region within said enclosed area, the conductive film extending out over the top of the first non-conductive coating to a position on said face spaced from the region,
(d) a coating of silicon dioxide on said face over the conductive film and the first non-conductive coating,
(e) a layer of glass on said face over the portion of the silicon dioxide coating which overlies said enclosed junction area,
(f) a third non-conductive coating overlying the body above the glass layer.

4. The semiconductor device defined by claim 3 wherein:
(a) the third non-conductive layer is composed of silicon dioxide, and
(b) the conductive film is composed of a layer of aluminum above a layer of molybdenum.

5. A semiconductor device comprising in combination:
(a) a semiconductor body having planar base and emitter regions formed therein,
(b) a first non-conductive coating overlying the semiconductor body, said coating having a plurality of apertures therein,
(c) conductive films deposited onto said body and making contact with the base and emitter regions through said apertures,
(d) at least one three layer structure overlying the first non-conductive coating and separating the conductive film which makes contact with the base region from the conductive film which makes contact with the emitter region,
said at least one three layer structure comprising a second and third silicon dioxide coating and a glass layer intermediate the second and third coatings.

6. The semiconductor device defined by claim 5 in which all of said non-conductive coatings are composed of silicon oxide.

7. The semiconductor device defined by claim 5 where a glass layer in one of said at least one three layer structure overlies the junction formed at the intersection of the semiconductor body and base region to seal said regions hermetically.

8. The semiconductor device defined by claim 5 where a glass layer in one of said at least one three layer structure overlies the junction formed at the intersection of the base and emitter regions to seal said regions hermetically.

9. In a semiconductor network comprising a semiconductor substrate with electronic components formed in one surface therein and various levels of interconnecting leads interconnecting with each other and with the components in said substrate, a three layer structure separating each level of interconnecting leads, said three layer structure comprising a first and second silicon dioxide coating and a glass layer intermediate the said coatings.

10. The structure defined by claim 9 where:

(a) at least one of the electronic components is a transistor comprising a base and emitter region, and (b) a glass layer in at least one of said three layer structures overlies said base and emitter region and the interconnections thereto sealing said regions hermetically.

11. In an electrical device having planar emitter and base regions, a first conductive film on an insulated substrate overlying at least said base and emitter regions, a second conductive film overlying the first film but separated therefrom by insulating means, said insulating means comprising a layered structure including a first layer of silicon oxide overlying the first conductive film, a layer of glass overlying the first layer of silicon oxide, and a second layer of silicon oxide overlying the layer of glass, the second layer of silicon oxide underlying the second conductive film.

12. The method of making a hermetically sealed planar semiconductor device having a semiconductor wafer containing regions therein defined by junctions; comprising the steps of:

(a) applying a first layer of silicon oxide over said wafer, said first layer containing apertures therein, (b) depositing expanded metal contacts over said regions, said contacts making ohmic contact to said regions through said apertures, (c) applying a second layer of silicon oxide over said wafer, including said expanded metal contacts and said junctions, (d) applying a mixture of powdered glass and photoresistive material over said second silicon oxide layer, (e) removing substantially all of said mixture except at least the portions that cover said junctions, (f) heating said wafer to a temperature sufficient to remove said photoresistive material from the remainder of said mixture, thereby leaving a glass layer only over that portion of said oxide layer that at least covers said junctions, and (g) heating said wafer to a temperature sufficient to fuse said glass layer to said second silicon oxide layer, whereby said fused glass forms a hermetic layer over said junctions.

13. The method of making a hermetically sealed semiconductor device as defined in claim 12 including the step of applying another layer of silicon oxide on said glass layer.

References Cited

UNITED STATES PATENTS

| | | | |
|---|---|---|---|
| 3,146,135 | 8/1964 | Chih-Tang Sah | 148—33.3 |
| 3,200,310 | 8/1965 | Carman | 317—234 |
| 3,226,611 | 12/1965 | Haenichen | 317—234 |
| 3,247,428 | 4/1966 | Perri et al. | 317—234 |
| 3,266,127 | 8/1966 | Harding et al. | 29—155.5 |
| 3,300,339 | 1/1967 | Perri et al. | 117—215 |
| 3,312,871 | 4/1967 | Seki et al. | 317—101 |
| 3,323,956 | 6/1967 | Gee | 148—177 |

JOHN W. HUCKERT, *Primary Examiner.*

JAMES D. KALLAM, *Examiner.*

R. F. SANDLER, *Assistant Examiner.*